F. HUME

Sept. 8, 1931. MACHINE FOR USE IN THE MANUFACTURE OF SHOES Re. 18,179

Original Filed Nov. 30, 1925 3 Sheets-Sheet 1

Inventor:
Fred Hume,
by Rippey & Kingsland,
His Attorneys.

F. HUME

Sept. 8, 1931. MACHINE FOR USE IN THE MANUFACTURE OF SHOES Re. 18,179

Original Filed Nov. 30, 1925 3 Sheets-Sheet 2

Inventor.
Fred Hume,
by Pippey & Kingsland.
His Attorneys.

F. HUME
Sept. 8, 1931. MACHINE FOR USE IN THE MANUFACTURE OF SHOES Re. 18,179
Original Filed Nov. 30, 1925 3 Sheets-Sheet 3
Fig. 4.
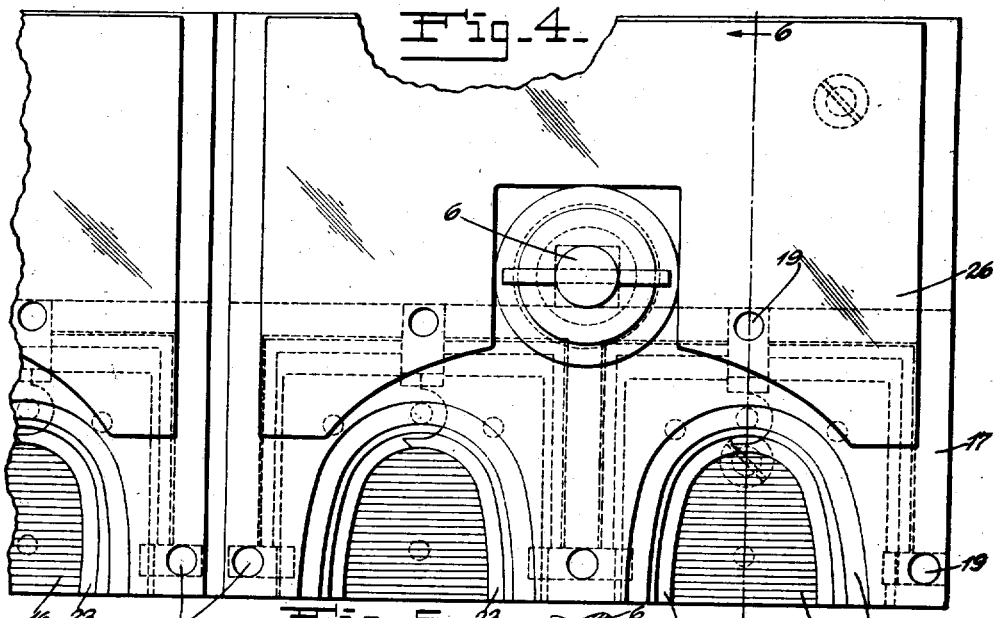
Fig. 5.
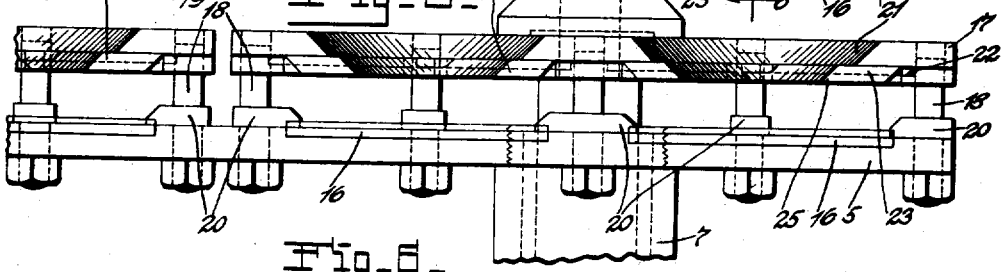
Fig. 6.
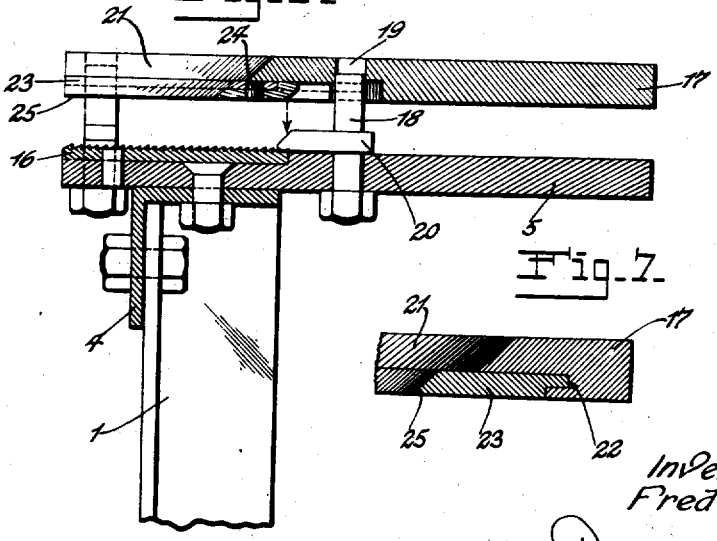
Fig. 7.
Inventor:
Fred Hume,
by Dippy Humphreys.
His Attorneys.

Reissued Sept. 8, 1931

Re. 18,179

UNITED STATES PATENT OFFICE

FRED HUME, OF ST. LOUIS, MISSOURI, ASSIGNOR, BY MESNE ASSIGNMENTS, TO UNITED SHOE MACHINERY CORPORATION, OF PATERSON, NEW JERSEY, A CORPORATION OF NEW JERSEY

MACHINE FOR USE IN THE MANUFACTURE OF SHOES

Original No. 1,693,276, dated November 27, 1928, Serial No. 72,140, filed November 30, 1925. Application for reissue filed November 26, 1929. Serial No. 410,010.

This invention relates to machines for use in the manufacture of shoes.

An object of the invention is to provide a machine by use of which the work of forming and shaping the toes of stitchdown shoes is greatly expedited and the cost of manufacture correspondingly reduced by providing devices for pressing the edge of the upper upon the edge of the sole and shaping the upper properly for attachment to the sole.

Another object of the invention is to provide a machine having presser and shaping devices, in combination with means for pressing said devices upon the shoe parts to be affected thereby and at the same time automatically actuating said devices to shape the adjacent portions of the uppers of the shoes and to secure them to the sole.

Another object of the invention is to provide a machine embodying the mechanisms mentioned, in combination with heating means for heating said pressing and shaping devices to adhesively attach the upper to the sole.

Other objects will appear from the following description, reference being made to the accompanying drawings, in which Fig. 1 is a front elevation of the machine embodying my invention.

Fig. 4 is an enlarged plan view of the pressing and shaping devices.

Fig. 5 is a front elevation thereof.

Fig. 6 is a sectional view on the line 6—6 of Fig. 4.

Fig. 7 is a sectional view showing the means for supporting the movable jaws.

Figure 1:
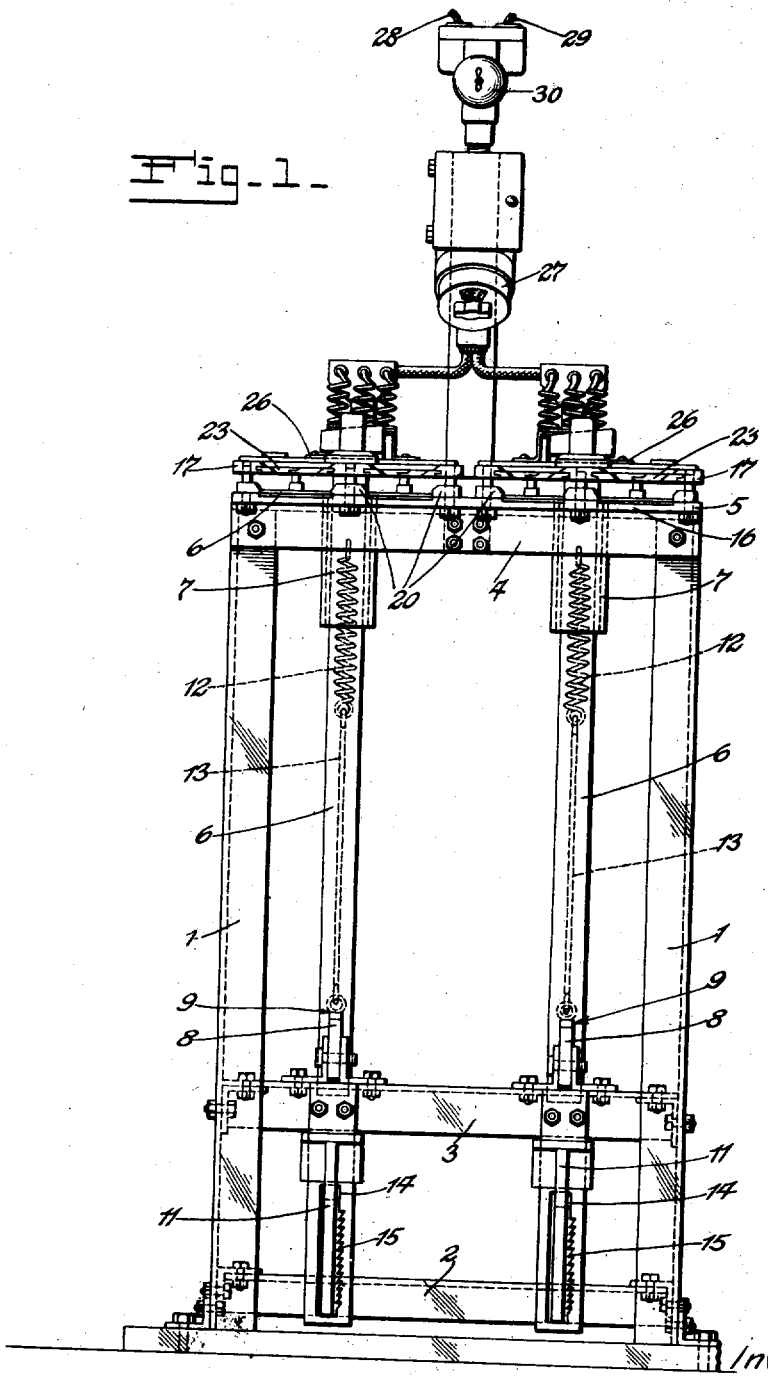
Figure 2:
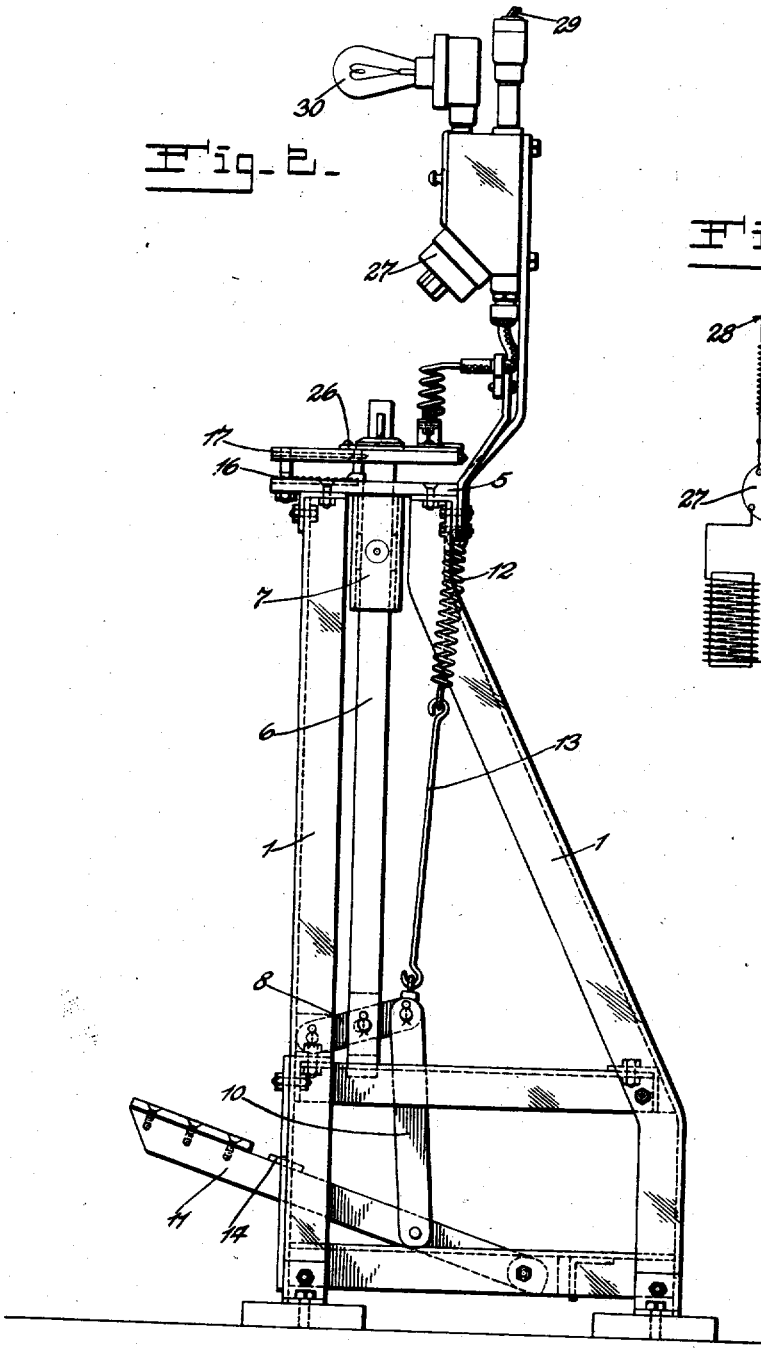
Fig. 2 is a side elevation.
Figure 3:
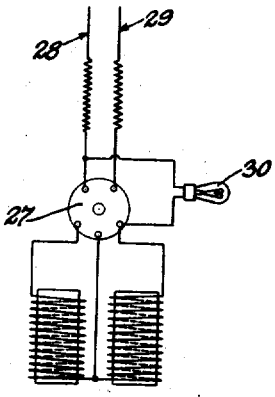
Fig. 3 is a diagrammatic view of the heating device.

The operative mechanism of the machine is supported by an appropriate frame comprising standards 1 strengthened by cross connections 2, 3 and 4 and supporting a top plate or table 5.

The specific embodiment of the invention shown comprises units, each of which is constructed and arranged to operate upon the toes of a pair of shoes. The invention may be varied in this respect and the operating mechanism may be constructed and designed to operate upon the heel seats or other parts of the shoes and to perform the entire shaping of said heel seats or other parts and to effect adhesive attachment of the same to the sole.

Each unit of the machine includes a shaft 6 mounted for vertical reciprocation through a bearing 7. The shafts 6 of the respective units may be independently operative as shown. The operating devices for each shaft include a lever 8 extending through a slot 9 in the corresponding shaft 6 and having its front end pivoted to the cross connection 3 and its rear end connected by a link 10 with a treadle lever 11. By downward pressure upon the treadle lever 11 the corresponding shaft 6 will be moved downwardly in opposition to a raising and supporting spring 12 connected to the lever 8 by a link 13. Thus it will be seen that the springs 12 raise the respective shafts 6 to and normally support them in their upper or starting positions, and that the treadles 11 are operative to lower the shafts 6 in opposition to the springs 12. Each of the shafts 6 may be held in its down position in opposition to its spring 12 by a device provided for that purpose. As shown, each treadle lever 11 has a lateral projection 14 designed and adapted to engage with the teeth of a ratchet 15 when the lever 11 is down. This is for the purpose of holding the presser and shaping devices pressed upon the shoes until the purpose of such operation has been completed.

The front or working side edge of the table top 5 has a number of serrated plates 16 attached thereto. The under side of the toe extremities of the soles are placed upon the plates 16 when the uppers are to be pressed to shape and attached to the soles. The serrations on the plates 16 prevent the sole from slipping. Each of the shafts 6 supports one or more presser and shaping devices and, in the embodiment of the invention shown, each shaft 6 supports a pair of such presser and shaping devices.

A plate 17 is detachably secured to the upper end of each shaft 6 above the table top 5 and is movable with the shaft to which it is attached. The plates 17 are guided vertically and held from lateral oscillation by rods 18 extending upwardly from the table top into holes 19 in the plate 17. Cams 20 are rigid with the rods 18 and face the sides and the inner ends of the plates 16. Pressing and shaping devices are supported by the plates 17, one or more of such devices being provided for each of the plates 16. The plates 17 have recesses 21 to receive the toes of shoes for shaping the toe portion of the uppers during operation of the machine.

The under side of the plates 17 have grooves 22 receiving the outer edges of wipers 23, the two wipers of each pair being connected by pivots 24 at their inner ends permitting converging and spreading movements of the outer ends of the wipers. The wipers 23 have beveled inner edges 25, the beveled upper surfaces flaring upwardly and outwardly forming attenuated lower edges. When the shaft 6 is moved down by operation of its treadle 11 the inner end and the side edges of the wipers 23 operate against the cams 20 with the result that the cam 20 at the inner end pushes the wipers outwardly and the cams 20 at the sides push the wipers toward each other. This causes the edges 25 of the wipers to press the toe portion of the upper inwardly under and around the former, or last, and the edge portion of the upper upon the upper side of the projecting margin of the sole. Glue having been applied between the upper and the sole, the upper will be properly shaped and secured to the sole.

The machine may include heating devices to heat the shaper and presser. As shown conventionally an electric heater 26 is in connection with each of the plates 17. This heater is preferably a multiple stage resistance heater and is controlled by a multiple point switch 27 in order to obtain the different degrees of heat required for different purposes. Thus the shaper or presser may be heated to different degrees in conformity with the requirements of the operations. The resistance circuit is energized by leads 28 and 29, and there is interposed in the circuit a light circuit controlling the light 30 indicating when the circuit is open or closed, it being understood that the lamp is lighted when the circuit is closed.

The wipers 23 are removable and interchangeable, and wipers for operating on shoes of different sizes may readily be mounted in the machine.

This machine greatly facilitates and expedites the work for which it is intended, and by use of the machine one operator can perform a great deal more work than has been possible by use of other machines now in general use.

The construction of the machine and the arrangement of the parts thereof may be varied within equivalent limits without departure from the nature and principle of the invention as set forth in the appended claims.

Having thus described my invention, what I claim as new and desire to secure by Letters Patent of the United States is:

1. A machine of the character described comprising a table, a movable plate supported above said table and having a recess in one edge thereof, mechanism for raising and lowering said plate, wipers supported at the sides of said recess for converging movement, and cams supported by said table for converging said wipers when said plate is lowered.

2. A machine of the character described comprising a table, a movable plate supported above said table and having a recess in one edge thereof, mechanism for raising and lowering said plate, wipers supported at the sides of said recess for longitudinal and converging movements, cams supported by said table for converging said wipers when said plate is lowered, and a cam for actuating said wipers longitudinally in one direction simultaneously with the converging movement of said wipers.

3. A machine of the character described comprising a table, a toothed plate supported by said table, a movable plate above said table having a recess in one edge thereof, mechanism for raising and lowering said movable plate, wipers supported by said movable plate at the sides of said recess for longitudinal and converging movements and arranged to receive between them the toe of a shoe the sole of which is seated on said toothed plate, means for converging said wipers when said movable plate is lowered, and means for imparting a longitudinal movement to said wipers simultaneously with said converging movement.

4. A machine of the character described comprising a table, a movable support above said table, a pair of wipers carried by said support for converging and longitudinal movements, mechanism for moving said support toward said table, and means for imparting converging and longitudinal movements to said wipers when said wipers are moved toward said table.

5. A machine of the character described comprising a rigid shoe-supporting table, a plate supported above said table and having a recess in one edge to receive the toe of a shoe seated on said table, a pair of pivotally connected wipers supported by said plate at the sides of said recess for wiping the toe portion of the shoe upper, and mechanisms for operating said plate and said wipers to wipe the toe portion of the shoe upper while the shoe remains stationary on said table.

6. A machine of the character described comprising a rigid shoe-supporting table, a movable plate supported above said table and having a recess in one edge to receive the toe of a shoe seated on said table, a pair of pivotally connected wipers supported by said plate at the sides of said recess for engaging and wiping the toe portion of the shoe upper, mechanism for moving said plate and said wipers toward and away from said table, and means for converging the wipers when said plate is lowered to wipe the toe portion of the shoe upper and press the same inwardly and around the toe of a former or last.

7. A machine of the character described comprising a rigid supporting table, a movable plate supported above said table and having a recess in one edge to receive the toe of a shoe seated on said table, a shaft at right angles to said table and said plate supporting said plate, means for moving said shaft longitudinally in directions to move said plate toward and away from said table, a wiper supported by said plate at each side of said recess for wiping the toe portion of the shoe upper when said plate is moved toward said table, and means for converging said wipers when said plate is moved toward said table to wipe and press inwardly the toe portion of the shoe upper.

8. A machine of the character described comprising a rigid shoe-supporting table, a movable plate above said table having a recess in one edge, a shaft at right angles to said table and said plate supporting said plate, means for moving said shaft longitudinally in directions to move said plate toward and away from said table, a wiper supported by said plate at each side of said recess for wiping the toe portion of the shoe upper while said shoe is seated on said table, a pivot connecting the inner ends of said wipers, means for converging said wipers when said plate is moved toward said table as aforesaid, and means for preventing lateral oscillation of said plate during operation thereof.

9. A machine of the character described comprising a rigid shoe-supporting table, a movable plate above said table having a recess in one edge thereof, means in connection with said table for holding a shoe from sliding thereon, mechanism for raising and lowering said movable plate, wipers supported by said movable plate for converging movement at the sides of said recess for wiping the toe portion of a shoe upper while the shoe is seated on said means and when said movable plate is lowered, a pivot connecting the inner ends of said wipers, and means for converging said wipers to press the toe portion of the upper inwardly.

10. A machine of the character described comprising a rigid support for a shoe, a device on said support for preventing outward movement of the shoe during operation of the machine, a movable plate above said support having a recess in one edge thereof to receive the toe of a shoe seated on said device, mechanism for raising and lowering said plate, wipers supported by said plate for converging movement at the sides of said recess for wiping the toe portion of the shoe upper seated on said support, a pivot connecting the inner ends of said wipers, means for preventing oscillation of said plate during movement thereof, and elements on said support for converging said wipers to press the toe portion of the upper inwardly.

11. A machine of the character described comprising a rigid table, a shoe-supporting element secured to said table, a movable plate above said table having a recess in one edge above said shoe supporting element, devices for raising and lowering said movable plate, pivotally connected wipers carried by said movable plate and extending to the sides of said recess for wiping the toe portion of the shoe upper while the shoe remains seated on said element, and cams rigid on said table for imparting longitudinal and converging movements to said wipers simultaneously when said plate is lowered as aforesaid to cause said wipers to wipe the toe portion of the shoe upper and to press the same inwardly under the lower corners of a last in the shoe.

12. A machine of the character described comprising a rigid shoe support, a movable plate above said support, a pair of pivotally connected wipers carried by said plate for converging and longitudinal movements to wipe the toe portion of a shoe upper while the shoe remains seated on said support, means for moving said plate toward and away from said support, means rigid on said support below said plate for imparting said converging and longitudinal movements to said wipers when said plate is moved toward said support, and means for heating said wipers.

13. A machine of the character described comprising a rigid support for supporting a shoe, means for preventing longitudinal movement of a shoe seated on said support, a movable wiper support, a pair of pivotally connected wipers carried by said wiper support for wiping the toe portion of the shoe upper while the shoe remains seated on said shoe support, mechanism for moving said wipers toward and away from said shoe support, and devices rigid on said first-named support below said wiper support for imparting converging and longitudinal movements to said wipers when said wipers are moved toward said support and causing said wipers to wipe the toe portion of the shoe upper and press the toe portion of the shoe upper inwardly under the corners of a last in the shoe.

14. A machine of the character described comprising a rigid support for a shoe, a movable wiper carrier, a pair of pivotally connected wipers carried by said carrier for wiping the toe portion of a shoe upper while the shoe is seated upon said support, mechanism for actuating said wiper carrier, and devices rigid on said support below said carrier for imparting longitudinal and converging movements to said wipers to cause said wipers to wipe the toe portion of the upper on opposite sides and beyond the toe of the last and to press the shoe upper into firm contact with the marginal portions of the sole.

15. In a machine of the character described, a rigid support, a shaft extending vertically above and below said support, a movable wiper carrier attached to said shaft above said support, a pair of pivotally connected wipers carried by said carrier for wiping the toe portion of a shoe upper while the shoe remains stationary upon said support, and mechanism below said support for operating said shaft to move said wipers to wipe the toe portion of the shoe upper while the shoe remains stationary on said support.

16. In a machine of the character described, a rigid support, a shaft extending vertically above and below said support, a wiper carrier attached to said shaft above said support, a pair of pivotally connected wipers carried by said carrier for wiping the toe portion of a shoe upper while the shoe remains stationary upon said support, mechanism below said support for operating said shaft to move said wipers to wipe the toe portion of the shoe upper while the shoe remains stationary on said support, and devices mounted on said support for imparting longitudinal and converging movements to said wipers simultaneously when said wipers are operated, as aforesaid.

17. A machine of the character described comprising toe embracing wipers organized to move longitudinally during their operation on the shoe and to converge relatively to the toe of a shoe upon a last, means for operating the wipers, a shoe support to receive the shoe right side up and to support the shoe including the projecting margin of the sole for the operation of the wipers, and means for relatively moving the wipers and the support heightwise of the shoe to last the toe.

18. A machine of the character described comprising wipers organized to move longitudinally of and to converge relatively to the toe of a shoe upon its last during their operation on the shoe, a shoe support to receive the shoe right side up and to support the shoe and last including the projecting margin of the sole, and means for relatively moving the wipers and support to wipe the upper heightwise of the last toward the shoe bottom and to press the edge portion of the upper against the projecting margin of the sole.

19. A machine of the character described comprising end bracing wipers constructed and arranged for converging movement and for movement longitudinally of a shoe upon its last during their operation on the shoe, a support to receive the bottom of the shoe when presented right side up to the wipers and adapted to support the shoe and last including the projecting margin of the sole on the last, and means for effecting relative movement between the support and wipers heightwise of the shoe to bring the shoe into the field of operation of the wipers and to cause the wipers to be effective to wipe the upper over the last and against the projecting margin of the sole.

20. A machine of the character described comprising a support to receive a shoe right side up on a last and having a projecting sole and to support the shoe and last including the margin of the sole, toe embracing wipers organized for longitudinal and converging movements relatively to the toe of the last during their operation on the shoe, and means for effecting relative movement between the wipers and the support heightwise of the shoe to cause the wipers to conform the upper to the end and sides of the last and to press the edge portion of the upper against the margin of the sole.

21. A machine of the character described comprising a support to receive the bottom of a shoe to be lasted and adapted to sustain the margin of the sole which projects beyond the last bottom, toe embracing means constructed and arranged to move longitudinally of the shoe and to converge laterally of the shoe, said toe embracing means and the support being arranged for relative movement for wiping the toe portion of the upper at the end of the toe and on opposite sides of the median line of the last simultaneously over the sides of the last and into firm contact with the projecting marginal portion of the sole, means for simultaneously causing movement of said toe embracing means longitudinally of the shoe and converging movement laterally of the shoe to press portions of the upper into the angle between the last and the sole margin, and means for effecting relative heightwise movement between the support and the toe embracing means.

22. A machine of the character described comprising means for supporting an upper and a projecting sole assembled upon a last, and a plurality of wiper plates constructed and arranged for relative converging movement and for bodily movement longitudinally of the last during their operation on the shoe for wiping the upper over the sides of the last at the end of the toe and on each side of the toe portion and for pressing the edge portions of the upper firmly into contact with the projecting surfaces of the projecting marginal portions of the sole.

23. A machine of the character described comprising a support for the bottom of a shoe adapted to sustain a last and the marginal portions of the sole that project beyond the bottom of the last, toe lasting means comprising a pair of wiper plates constructed and arranged for movement longitudinally of the last during their operation on the shoe and for relative converging movement toward each other and adapted upon relative movement between the support and the wipers to wipe the toe portions of the upper of the shoe over the last at the end and on each side of the median line thereof to press edge portions of the upper about the toe portion thereof simultaneously in finally lasted position in firm contact with the upper surface of the projecting marginal portions of the sole, and means for causing relative movement between the support and the lasting means to effect the lasting operation.

24. A machine of the character described comprising a support for the bottom of a shoe adapted to sustain a last and the marginal portions of a sole that project beyond the bottom of the last, a pair of end embracing wipers pivoted together at their ends adjacent to the end of the shoe constructed and arranged for bodily movement longitudinally of the shoe and for relative converging movement to adapt them to shape the toe of the shoe upper and operated upon movement of the support and wipers heightwise of the shoe to wipe portions of the upper of the shoe over the end and sides of the last and to press edge portions of the upper peripherally of the shoe simultaneously into finally lasted position in firm contact with the upper surface of the marginal portions of the sole, and means for effecting relative movement heightwise of the shoe between the support and the wipers.

25. A machine of the character described comprising a support constructed and arranged to receive the bottom of a shoe and to support the marginal portions of the sole that project beyond the bottom of the last, toe lasting means comprising end embracing wipers constructed and arranged for bodily movement longitudinally of the toe during their operation on the shoe and for converging movement against the sides of the toe to wipe portions of the upper of the shoe over the end and sides of the last and to press edge portions of the upper about the periphery of the toe in finally lasted position in the angle between the side of the last and the projecting marginal portions of the sole and in firm contact with the upper surfaces of said marginal portion, and means for causing relative movement between the work support and the wipers to effect the lasting operation.

26. A machine of the character described comprising a support for the bottom of a shoe adapted to sustain a last and the marginal portions of a sole that project beyond the bottom of the last, wiping members movable relatively to each other and movable bodily longitudinally of the shoe during their operation on the shoe, said members being operated upon relative movement between the support and the members heightwise of the shoe to wipe portions of the upper of the shoe over the end and sides of the last and to press edge portions of the upper into firm contact with the upper surface of the marginal portions of the sole about the toe, means for causing said bodily and relative movements of the members, and means for causing said relative heightwise movement between the support and wiping members to effect the wiping and pressing operations.

27. A machine of the character described comprising toe embracing wipers constructed and arranged to move longitudinally of a shoe during their operation on the shoe and to converge relatively to the toe of a shoe upon a last, a shoe support to receive the shoe and to support the shoe including the projecting margin of the sole for the operation of the wipers, and means for relatively moving the wipers and the support heightwise of the shoe.

28. A machine of the character described comprising toe embracing wipers constructed and arranged to move longitudinally and to converge relatively to the toe of a shoe upon a last, a shoe support to receive the shoe and to support the shoe including the projecting margin of the sole for the operation of the wipers, means for relatively moving the wipers and the support heightwise of the shoe, and means for heating the wipers.

29. A machine of the character described comprising toe embracing wipers constructed and arranged to move longitudinally of a shoe during their operation on the shoe and to converge relatively to the toe of a shoe upon a last, a shoe support to receive the shoe and to support the shoe including the projecting margin of the sole for the operation of the wipers, means for relatively moving the wipers and the support heightwise of the shoe, and means for causing the wipers to move longitudinally and converge relatively to the toe.

30. A machine of the character described comprising toe embracing wipers constructed and arranged to move longitudinally of and to converge relatively to the toe of a shoe upon a last during their operation on the shoe, a shoe support to receive the shoe and to support the shoe including the projecting margin of the sole for the operation of the wipers, means for relatively moving the wipers and the support heightwise of the shoe, and means for causing the wipers to move longitudinally and converge relatively to the toe to press the upper inwardly under the lower corners of the last.

31. A machine of the character described comprising toe embracing wipers constructed and arranged to move longitudinally of and to converge relatively to the toe of a shoe upon a last during their operation on the shoe, a shoe support to receive the shoe and to support the shoe including the projecting margin of the sole for the operation of the wipers, means for relatively moving the wipers and the support heightwise of the shoe, and means for causing the wipers to move longitudinally and converge relatively to the toe to press the toe portion of the upper inwardly under and around the toe of the last.

32. A machine of the character described comprising a support to receive a shoe right side up on a last having a projecting sole and to support the shoe and last including the margin of the sole, toe embracing wipers organized for longitudinal and converging movements relatively to the toe of the last during their operation on the shoe, and means for causing said longitudinal and converging movements of the wipers to conform the upper to the end and sides of the last and for causing relative movement between the wipers and the support heightwise of the shoe to press the edge portion of the upper against the margin of the sole.

33. A machine of the character described comprising a support for the bottom of a shoe adapted to sustain a last and the marginal portion of a sole that projects beyond the bottom of the last, a pair of end embracing wipers pivoted together at their ends adjacent to the end of the shoe and constructed and arranged for bodily movement longitudinally of the shoe and for relative converging movement to adapt them to shape the toe of the shoe upper, means for effecting said longitudinal converging movements of the wipers to press the edge portion of the upper peripherally of the shoe toe inwardly under and around the toe of the last, and means for effecting relative movement heightwise of the shoe between the support and the wipers to press the edge portion of the upper upon the upper side of the projecting margin of the sole.

34. A machine of the character described comprising wipers organized to move longitudinally and to converge relatively to the toe of a shoe upon its last, a shoe support to receive the shoe and to support the shoe and last including the projecting margin of a sole, means for relatively moving the wipers and support to wipe the upper heightwise of the last toward the shoe bottom and to press the edge portion of the upper against the projecting margin of the sole, and means for holding the shoe against movement in response to the action of the wipers in shaping the shoe upper.

35. A machine of the character described comprising end embracing wipers constructed and arranged for converging movement and for movement longitudinally of a shoe upon its last, a support to receive the bottom of the shoe and adapted to support the shoe and last including the projecting margin of a sole, means for effecting relative movement between the support and wipers heightwise of the shoe to bring the shoe into the field of operation of the wipers and for effecting longitudinal movement of the wipers toward the shoe, and means for holding the shoe against longitudinal movement in response to the longitudinal movement of the wipers toward the shoe.

36. A machine of the character described comprising end embracing wipers constructed and arranged for converging movement and for movement longitudinally of a shoe upon its last, a support to receive the bottom of a shoe when presented right side up to the wipers and adapted to support the shoe and last including the projecting margin of a sole on the last, means for effecting relative movement between the support and wipers heightwise of the shoe to bring the shoe into the field of operation of the wipers, means for effecting said converging and longitudinal movements of the wipers to cause the wipers to wipe the upper against the toe end of the last, and a serrated plate on the shoe support and engaging the bottom of the shoe to prevent sliding of the shoe during the operation of the wipers.

37. A machine of the character described comprising end embracing wipers constructed and arranged for converging movement and for movement longitudinally of a shoe upon its last during their operation on the shoe, a shoe support adapted to support the projecting margin of the shoe sole upon a last, means for effecting relative movement of the wipers and the support heightwise of the shoe to shape the upper to the last, and means operative to effect longitudinal and converging movements of the wipers, said last-named means being constructed and arranged to initiate said longitudinal and converging movements substantially at the termination of said relative heightwise movement to force the upper into the angle between the side of the last and the projecting margin of the sole under the last bottom while the outturned margin of the upper lies against the projecting margin of the sole.

In testimony whereof I have signed my name to this specification.

FRED HUME.